F. M. CASE.

CLEANER.

APPLICATION FILED APR. 3, 1916.

Reissued Oct. 23, 1917.

14,383.

3 SHEETS—SHEET 1.

Witnesses.
Edward T. Wray.
Minnie M Lindeman

Inventor.
Francis M. Case.
by Piper & Carter
Attorneys.

F. M. CASE.

CLEANER.

APPLICATION FILED APR. 3, 1916.

Reissued Oct. 23, 1917.

14,383.

3 SHEETS—SHEET 2.

Witnesses.
Edward T. Wray.
Minnie M. Lindeman

Inventor.
Francis M. Case.
by Parker & Carter
Attorneys.

F. M. CASE.

CLEANER.

APPLICATION FILED APR. 3, 1916.

Reissued Oct. 23, 1917.

14,383.

3 SHEETS—SHEET 3.

Witnesses.
Edward T. Wray.
Minnie M. Lindemann

Inventor.
Francis M. Case.
by Parker & Carter
Attorneys.

UNITED STATES PATENT OFFICE.

FRANCIS M. CASE, OF CLEVELAND, OHIO, ASSIGNOR TO THE HOOVER SUCTION SWEEPER COMPANY, OF NEW BERLIN, OHIO, A CORPORATION OF OHIO.

CLEANER.

14,383. Specification of Reissued Letters Patent. Reissued Oct. 23, 1917.

Original No. 1,147,307, dated July 20, 1915, Serial No. 583,854, filed September 26, 1910. Application for reissue filed April 3, 1916. Serial No. 88,746.

*To all whom it may concern:*

Be it known that I, FRANCIS M. CASE, a citizen of the United States, residing at Cleveland, in the county of Cuyahoga and State of Ohio, have invented a certain new and useful Improvement in Cleaners, of which the following is a specification.

This invention relates to apparatus for cleaning surfaces and surface-coverings generally, and is designed to brush and vibrate the covering and at the same time draw all dirt and dust, liberated by the brushing and vibrating action, into the machine and discharge it into a suitable receptacle. Brushing is designed particularly to loosen objects which may tend to stick to the surface, vibrating to loosen and bring to the surface objects or particles lodged below the surface, and the air current hereafter referred to, to carry all such objects and particles from the surface or mesh of the floor covering up into the casing.

More specifically the invention contemplates an apparatus comprising a casing having a suitable discharge and discharge receptacle, a hood having an unobstructed inlet opening or mouth whereby the surface covering may be suspended against the entire mouth, together with a brush mounted in the hood above the inlet opening, and means for creating a sufficient suction at the inlet opening whereby the surface-covering is drawn tightly against the edge of the hood about the inlet opening or mouth in a manner such that the brush may vibrate and brush the cover to loosen or free the dirt and dust which is conveyed by the air passing through the covering into the casing and discharged into the discharge receptacle, from whence it may be emptied after the removal of the discharge receptacle from the device. The brush if intended to vibrate must be of such a nature, for example as illustrated in the drawing, as to strike or beat the floor covering when the covering is lifted and held off the floor.

Invention further resides in certain details of construction hereinafter set forth in the following description, drawings and claims.

Referring to the drawings, Figure 1 is a side elevation of the device;

Fig. 7 is a sectional view showing the mounting of the supporting wheels;

Figure 1:
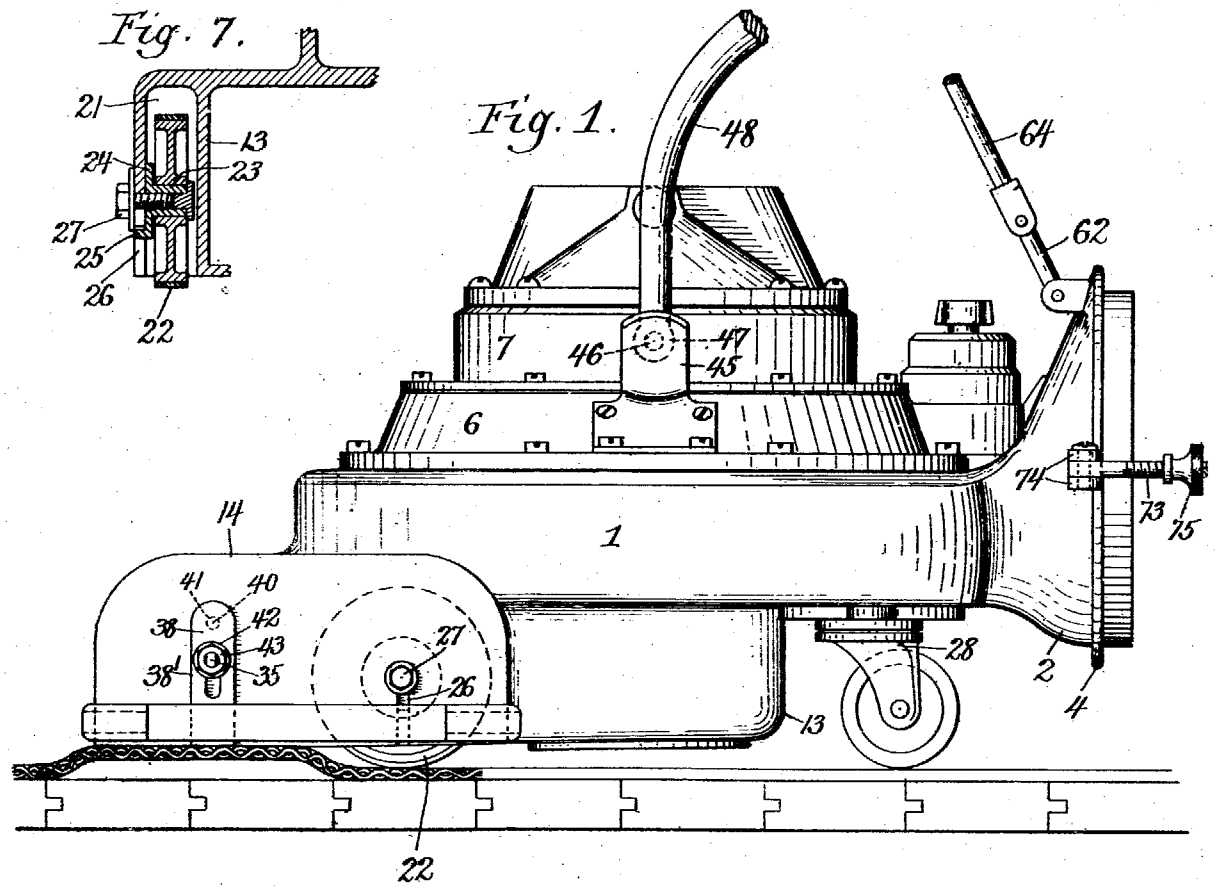
Figures 2, 8, 9:
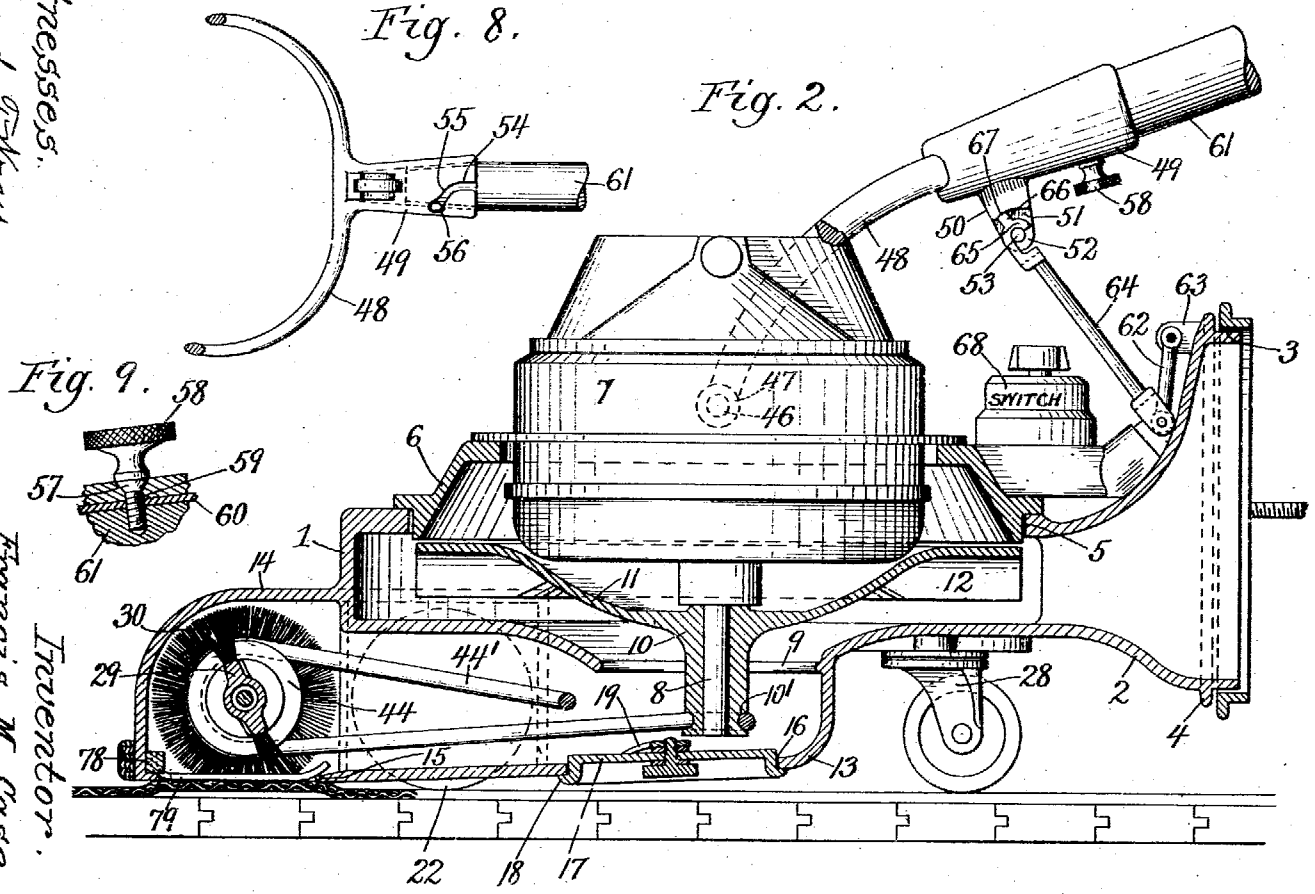
Fig. 2 is a longitudinal vertical section partly in elevation.
Fig. 8 is an elevation of a portion of the handle socket.
Fig. 9 is a detail view partly in section showing the clamping screw and arrangement of securing the handle in the socket.

In carrying out my invention any preferred form and construction of parts may be employed so long as they possess the necessary characteristics, but I have shown one construction in the drawings which is highly effective in operation, and in such embodiment 1 represents the main casing in the form of a fan scroll with an opening for the fan, to be described, and provided with a suitable discharge member 2 having a short cylindrical portion 3 having a stop flange 4 upon its exterior against which a suitable ring 71 of a discharge receptacle, to be disclosed later, is held by mechanism to be described. The casing 1 is further provided with an opening 5 in its top for receiving a supporting ring 6 upon which a motor 7 is mounted. This motor has its shaft 8 arranged vertically, and it projects into the casing and through an inlet opening 9 at the bottom, as shown in Fig. 2. Mounted upon the shaft 8 is a fan hub 10 of a fan disk 11 provided with blades 12 arranged in a manner such that they will draw air through the opening 9 and discharge the same through the discharge member 2. The fan hub 10 is provided near its lower end with a pulley groove 10′ for a purpose to be described.

Figure 3:
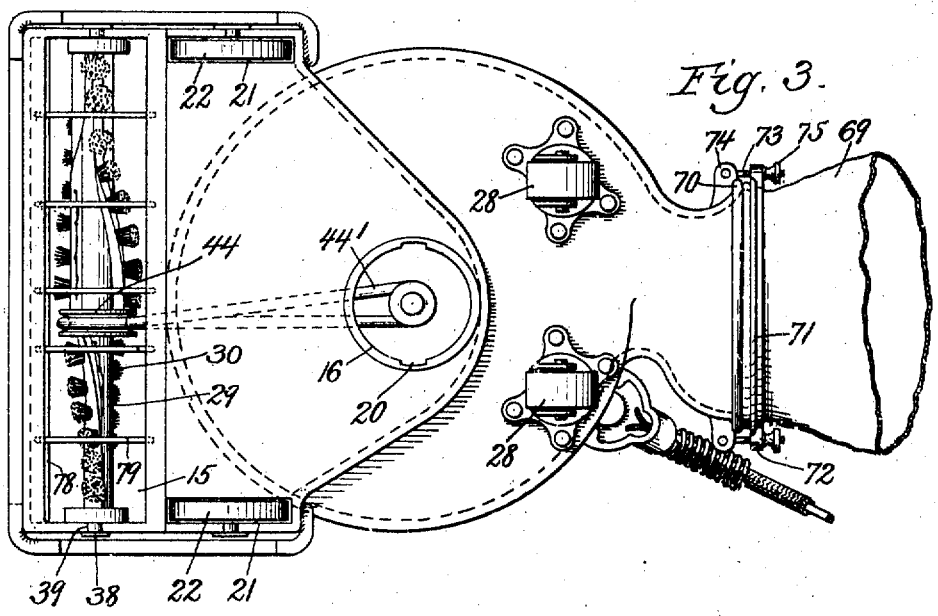
Fig. 3 is a bottom plan view.

The opening 9 communicates with the opening of an auxiliary hollow casing member 13 projecting downward from the bottom of the main casing and broadening out toward the forward end of the main casing where it emerges into a hood 14 provided with a longitudinal mouth or inlet opening 15 in the bottom. The auxiliary casing 13 is closed except for the opening 15 and another opening 16 just below the motor shaft and this opening is closed by a suitable hand-hole plate 17 provided with a flange 18 and held in place by a suitable latching spring 19 which passes through recesses 20, shown in Fig. 3 and above the inner surface of the bottom portion of the auxiliary casing member. The auxiliary casing 13 is still further provided with recesses 21, one on each side, and each receiving a supporting wheel 22 mounted upon a bearing sleeve 23 carried by a plate 24 having a lug 25 for engagement with a vertically disposed slot 26 in the side of the auxiliary casing. A suitable bolt 27 passes through the slot and is threaded into the bearing sleeve 23 whereby the supporting wheels 22 may be held in any adjusted position in the slot 26. The object of the adjustment of these wheels is to permit the proper positioning of the mouth of the hood with respect to the surface operated upon.

The main casing 1 is still further provided with suitable casters 28 secured to the underside of the same and to the rear of the auxiliary casing 13 as it projects below the main casing at the rear. These rollers support the rear end of the device.

The support of the casing upon the casters 28 and the supporting wheels 22 and the adjustment of the latter is such that when cleaning a surface, at which time the mouth of the suction hood should be close to the surface, or when cleaning a carpet, rug or other surface-covering, when the mouth of the suction hood should be raised above the covering, the plane of the walls of the hood about the mouth of the suction hood is substantially in parallelism with the surface so that there is practically an even suction on all parts of the portion operated upon, thus insuring perfect work.

Figure 4:
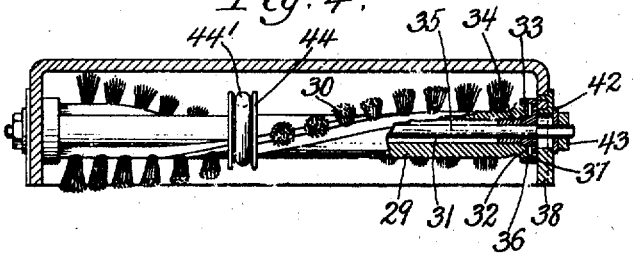
Fig. 4 is a section through the hood showing the brush partly in elevation and partly in section.
Figure 5:
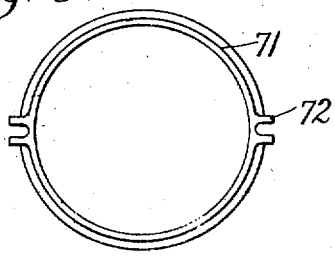
Fig. 5 is a detail view of the clamping ring for holding the discharge bag or receptacle in place.
Figure 6:
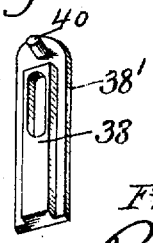
Fig. 6 is a detail view of the supporting block for the shaft of the brush.

In order that dust and dirt may be loosened or brushed from the surface to be treated a suitable brush is provided, and it comprises a body portion 29 having mounted thereon in any suitable manner bristles 30. For vibrating purposes I prefer the brush shown whereby a striking, beating or vibrating effect intermediate the brushing effect is produced when the brush is driven at a high rate of speed. As here illustrated, every rotation of the brush results in both brushing and striking, beating or vibrating the fabric. This body portion 29 is provided with an opening 31 extending from one end to the other and with an enlarged portion 32 at each end. Each of such portions is recessed at 33 on the end whereby a bearing bushing 34, driven or otherwise secured into the opening 31 at each end of the body portion, may project beyond into the recess, as shown in Fig. 4. These bushings have their bearing upon a shaft 35 which passes through the opening 31 and through suitable plate members 36, each provided with a recess 37 for receiving the corresponding enlarged portions 32 of the body portion. The shaft 35 at each end of the hood passes through a block 38 mounted in a slot 39 at each end of the hood 14. Each of these blocks 38 is provided with a pin 40 for engagement in a recess 41 arranged above the end of the slot 39 in each end of the hood, and with a flange 38′ engaging the outer face of the end of the hood about the slot. A suitable washer 42 and nut 43 on each end of the shaft serve as a means for clamping the several parts in place and holding the brush in proper position. The body portion of the brush is still further provided with a pulley 44 at a point such that a belt 44′ engaging in the pulley groove 10′ and passing over the pulley 44 may drive the brush.

In order to manipulate the sweeper suitable handle mechanism is provided, and it comprises a pair of clips 45 secured on opposite sides of the motor and each carrying a pin 46 extending through a suitable eye 47 at the end of each of the side members of a fork 48. This fork 48 is integral with a handle socket 49 which is provided with a downwardly extending member 50 provided with an open-ended slot 51 forming ears 52 in which a pin 53 is mounted. This pin is for a purpose to be described. The socket member 49 is further provided with a longitudinally disposed slot 54 communicating with a spirally arranged slot 55 extending to an opening 56 having beveled edges for receiving a tapered portion 57 of a nut 58 mounted upon the threaded shank of a bolt 59 passing through a sleeve 60 about a handle 61. When the nut 58 is turned so that its tapered portion 57 is out of engagement with the inclined edges of the socket member and the handle is to be removed from the socket, this operation is accomplished by turning the handle to the right or in the direction of the spiral slot 55 until the shank of the bolt reaches the longitudinal slot 54 when the handle may be pulled from the socket. The handle may be applied in a well known manner from the above description.

The downwardly projecting member 50 is a part of a connection between the handle and the discharge member, and this mechanism is for the purpose of arranging the handle so that by pressing down upon the same, the forward end of the sweeper may be raised above slight obstructions which must be passed over in operating the device, and this mechanism comprises a toggle link 62 pivotally mounted in suitable ears 63 forming a part of the discharge member 2 and pivotally connected to a relatively long link 64 having at its upper end a hook portion 65 adapted for engaging the pin 53. This hook has a projection 66 extending from the outer end of the hook and engaging an arc-shaped surface 67 at the bottom of the slot 51 whereby the hook is held upon the pin 53, except when the toggle links are thrown upward, or into a position opposite to that shown in Fig. 2, when the projection 66 will extend to the left of the surface 67 and the hook may be removed from the pin 53 when the handle will be released, but when the toggle links are in the position shown in Fig. 2 the front end of the device may be raised by bearing down upon the handle when the joint of the toggles will engage the discharge member 2, and the forward end of the sweeper is susceptible of being raised. A suitable cord (not shown) containing electrical conductors is attached to the device and the supply of current is controlled by a switch 68 mounted upon the main casing.

A discharge receptacle is provided for the device, and it comprises a bag 69 having a suitable mouth provided with a reinforcing ring or rim 70 which fits nicely over the discharge member and against the flange 4 and it is held in this position by a ring 71 provided with diametrically opposed slotted projections 72 adapted to receive bolts 73 mounted in ears 74 on the discharge member and having upon their outer ends suitable nuts 75, the bolts and the nuts serving by their engagement with the ring 71 to hold the discharge receptacle in place.

In order to prevent the carpet or other surface-covering from being drawn into the hood and bearing with too great a force against the bristles of the brush, a suitable guard is provided and it comprises a bar 78, shown in Fig. 2, secured in the front of the hood in any preferred manner and provided with fingers 79 which extend across the mouth of the hood and rest upon the opposite edge of the casing. These fingers bear against the carpet or other covering and prevent it from being drawn too tightly against the brush.

I claim:

1. In a cleaner for surface coverings, a main casing, supporting means therefor, an overhanging suction hood carried by the casing and in open communication therewith and extending freely beyond the same and the supporting means, said hood having a mouth on its underside adjacent to the front and having a continuous edge about the mouth in a horiontal plane in parallelism with the surface covered and at a distance therefrom, means for creating a suction within the main casing and hood, and a brush mounted in said hood, said brush comprising a body portion and bristles, the body portion being mounted sufficiently above the mouth of the hood so that the suction may draw the surface covering thereagainst to completely close the same.

2. In a cleaner for surface coverings, a main casing, supporting means therefor, an overhanging suction hood carried by the casing and in open communication therewith and extending freely beyond the same and the supporting means, said hood having a mouth on its underside adjacent to the front and substantially in parallelism with the surface covered and at a distance therefrom, means for creating a suction within the main casing and hood, and a brush mounted in said hood, said brush comprising a body portion and bristles, the body portion being mounted sufficiently above the mouth of the hood so that the suction may draw the surface covering thereagainst to completely close the same.

3. In a cleaner for surface coverings, a main casing, supporting means therefor, an overhanging suction hood carried by the casing and in open communication therewith and extending freely beyond the same and the supporting means, said hood having a mouth on its underside adjacent to the front and substantially in parallelism with the surface covered and at a distance therefrom, means for creating a suction within the main casing and hood, and a motor driven brush mounted in said hood, said brush comprising a body portion and bristles, the body portion being mounted sufficiently above the mouth of the hood so that the suction may draw the surface covering thereagainst to completely close the same.

4. In a cleaner for surface coverings, a main casing, supporting means therefor, an overhanging suction hood carried by the casing and in open communication therewith and extending freely beyond the same and the supporting means, said hood having a mouth on its underside adjacent to the front and having a continuous edge about the mouth in a horizontal plane in parallelism with the surface covered and at a distance therefrom, means for creating a suction within the main casing and hood, and a vibratory brush mounted in said hood, said brush comprising a body portion and bristles, the body portion being mounted sufficiently above the mouth of the hood so that the suction may draw the surface covering thereagainst to completely close the same.

5. In a cleaner for surface coverings, a main casing, supporting means therefor, an overhanging suction hood carried by the casing and in open communication therewith and extending freely beyond the same and the supporting means, said hood having a mouth on its under side adjacent to the front and substantially in parallelism with the surface covered and at a distance therefrom, means for creating a suction within the main casing and hood, and a vibratory brush mounted in said hood, said brush comprising a body portion and bristles, the body portion being mounted sufficiently above the mouth of the hood so that the suction may draw the surface covering thereagainst to completely close the same.

6. In a cleaner for surface coverings, a main casing, supporting means therefor, an overhanging suction hood carried by the casing and in open communication therewith and extending freely beyond the same and the supporting means, said hood having a mouth on its underside adjacent to the front and substantially in parallelism with the surface covered and at a distance therefrom, means for creating a suction within the main casing and hood, and a power driven vibratory brush mounted in said hood, said brush comprising a body portion and bristles, the body portion being mounted sufficiently above the mouth of the hood so that the suction may draw the surface covering thereagainst to completely close the same.

7. In a cleaner for surface coverings a main casing with a suction mouth, means for drawing a current of air through such mouth, supporting means for the casing and mouth whereby the mouth is maintained at a distance above the surface and substantially parallel therewith while it is moved thereover, said mouth separated from and unobstructed by the supporting means so that the covering is free to be drawn up to the mouth by the current of air and means in said mouth for vibrating said covering and throwing particles of dirt upwardly into the current of air while the covering is drawn up to such mouth by the air.

8. In a cleaner for surface coverings a main casing with a suction mouth, means for drawing a current of air through such mouth, supporting means for the casing and mouth whereby the mouth is maintained at a distance above the surface and substantially parallel therewith while it is moved thereover, said mouth separated from and unobstructed by the supporting means so that the covering is free to be drawn up to the mouth by the current of air and a single means in said mouth for both vibrating and brushing said covering while it is drawn up to such mouth by the air.

9. In a cleaner for surface coverings a main casing with a suction mouth, means for drawing a current of air through such mouth, supporting means for the casing and mouth whereby the mouth is maintained at a distance above the surface and substantially parallel therewith while it is moved thereover, said mouth separated from and unobstructed by the supporting means so that the covering is free to be drawn up to the mouth by the current of air, and a brush in said mouth so shaped that it will vibrate and brush said covering while it is drawn up to such mouth by the air.

10. In a cleaner for surface coverings a main casing with a suction mouth, means for drawing a current of air through such mouth, supporting means for the casing and mouth whereby the mouth is maintained at a distance above the surface and substantially parallel therewith while it is moved thereover, said mouth separated from and unobstructed by the supporting means so that the covering is free to be drawn up to the mouth by the current of air, and power driven means in said mouth for vibrating said covering and throwing particles of dirt upwardly into the current of air while the covering is drawn up to such mouth by the air.

11. In a cleaner for surface coverings a main casing with a suction mouth, means for drawing a current of air through such mouth, supporting means for the casing and mouth whereby the mouth is maintained at a distance above the surface and substantially parallel therewith, while it is moved thereover, said mouth separated from and unobstructed by the supporting means so that the covering is free to be drawn up to the mouth by the current of air, and a single power driven means in said mouth for both vibrating and brushing said covering while it is drawn up to such mouth by the air.

12. In a cleaner for surface coverings a main casing with a suction mouth, means for drawing a current of air through such mouth, supporting means for the casing and mouth whereby the mouth is maintained at a distance above the surface and substantially parallel therewith while it is moved thereover, said mouth separated from and unobstructed by the supporting means so that the covering is free to be drawn up to the mouth by the current of air, and a power driven brush in said mouth so shaped that it will vibrate and brush said covering while it is drawn up to such mouth by the air.

13. In a cleaner for surface coverings a main casing with a suction mouth, means for drawing a current of air through such mouth, supporting means for the casing and mouth whereby the mouth is maintained at a distance above the surface and substantially parallel therewith while it is moved thereover, and a single means in said mouth for both vibrating said covering and throwing particles of dirt upwardly into the current of air while the covering is drawn up to such mouth by the air.

14. In a cleaner for surface coverings a main casing with a suction mouth, means for drawing a current of air through such mouth, supporting means for the casing and mouth whereby the mouth is maintained at a distance above the surface and substantially parallel therewith while it is moved thereover, and a single means in said mouth for both vibrating and brushing said covering while it is drawn up to such mouth by the air.

15. In a cleaner for surface coverings a main casing with a suction mouth, means for drawing a current of air through such mouth, supporting means for the casing and mouth whereby the mouth is maintained at a distance above the surface and substantially parallel therewith while it is moved thereover, and a brush in said mouth so shaped that it will vibrate and brush said covering while it is drawn up to such mouth by the air.

16. In a cleaner for surface coverings a main casing with a suction mouth, means for drawing a current of air through such mouth, supporting means for the casing and mouth whereby the mouth is maintained at a distance above the surface and substantially parallel therewith while it is moved thereover, and a single power driven means in said mouth for both vibrating said covering and throwing particles of dirt upwardly into the current of air while the covering is drawn up to such mouth by the air.

17. In a cleaner for surface coverings a main casing with a suction mouth, means for drawing a current of air through such mouth, supporting means for the casing and mouth whereby the mouth is maintained at a distance above the surface and substantially parallel therewith while it is moved thereover, and a singe power driven means in said mouth for both vibrating and brushing said covering while it is drawn up to such mouth by the air.

18. In a cleaner for surface coverings a main casing with a suction mouth, means for drawing a current of air through such mouth, supporting means for the casing and mouth whereby the mouth is maintained at a distance above the surface and substantially parallel therewith while it is moved thereover, and a power driven brush in said mouth so shaped that it will vibrate and brush said covering while it is drawn up to such mouth by the air.

19. A cleaner comprising a casing supported above the floor covering and provided with a suitable discharge and a hood having an unobstructed inlet opening adapted to let the floor covering rise thereto, a brush mounted in the inlet opening shaped so as to vibrate the carpet and driven at high speed, a suction device adapted to draw a current of air through the mouth so as to cause the carpet to rise thereto, and a discharge receptacle connected with the discharge.

Signed at Cleveland, Ohio, this 29th day of March, 1916.

FRANCIS M. CASE.

Witnesses:
W. W. Steele,
D. Tozer.